United States Patent
Kocaman et al.

(10) Patent No.: US 12,312,179 B2
(45) Date of Patent: May 27, 2025

(54) MODULAR CONVEYOR BELT CARRYING PRODUCTS IN A REGULAR AND BALANCED MANNER

(71) Applicant: ISCIMENLER KAYISCILIK PAZARLAMA LIMITED SIRKETI, Izmir (TR)

(72) Inventors: Zafer Kocaman, Izmir (TR); Ibrahim Bayir, Izmir (TR)

(*) Notice: Subject to any disclaimer, the term of this patent is extended or adjusted under 35 U.S.C. 154(b) by 0 days.

(21) Appl. No.: 18/246,433

(22) PCT Filed: Jun. 2, 2021

(86) PCT No.: PCT/TR2021/050530
§ 371 (c)(1),
(2) Date: Mar. 23, 2023

(87) PCT Pub. No.: WO2022/255957
PCT Pub. Date: Dec. 8, 2022

(65) Prior Publication Data
US 2023/0356950 A1    Nov. 9, 2023

(51) Int. Cl.
*B65G 17/08* (2006.01)
*B65G 15/42* (2006.01)
*B65G 17/40* (2006.01)

(52) U.S. Cl.
CPC ............. *B65G 17/08* (2013.01); *B65G 15/42* (2013.01); *B65G 17/40* (2013.01)

(58) Field of Classification Search
CPC ......... B65G 17/08; B65G 15/42; B65G 17/40
USPC ....................................... 198/844.1
See application file for complete search history.

(56) References Cited

U.S. PATENT DOCUMENTS

| | | | | |
|---|---|---|---|---|
| 7,108,126 B2* | 9/2006 | Layne | ............ | B65G 17/063 198/852 |
| 7,111,725 B2* | 9/2006 | Marshall | ............ | B66B 23/12 198/853 |
| 7,559,422 B2* | 7/2009 | Layne | ............ | B65G 17/40 198/852 |
| 9,199,797 B2* | 12/2015 | Menke | ............ | B65G 47/268 |
| 9,527,671 B2* | 12/2016 | Marshall | ............ | B65G 17/06 |
| 2003/0024794 A1 | 2/2003 | Etherington | | |
| 2003/0196876 A1* | 10/2003 | Weiser | ............ | B65G 17/34 198/853 |
| 2008/0023304 A1 | 1/2008 | Elsner | | |
| 2010/0307892 A1 | 12/2010 | Elsner | | |

FOREIGN PATENT DOCUMENTS

CN      101336199 A    12/2008
WO        9806648 A1    2/1998

OTHER PUBLICATIONS

International Search Report for corresponding PCT/TR2021/050530 dated Mar. 1, 2022.
Written Opinion of the International Searching Authority for corresponding PCT/TR2021/050530 dated Mar. 1, 2022.

* cited by examiner

*Primary Examiner* — Gene O Crawford
*Assistant Examiner* — Lester Rushin, III
(74) *Attorney, Agent, or Firm* — Egbert, McDaniel & Swartz, PLLC

(57) ABSTRACT

A modular conveyor belt is used for transportation in industry, and enables products with oval geometry that are likely to move on the belt, to be transported in a regular and balanced manner without causing any accumulation.

5 Claims, 1 Drawing Sheet

MODULAR CONVEYOR BELT CARRYING PRODUCTS IN A REGULAR AND BALANCED MANNER

TECHNOLOGICAL FIELD

The present invention relates to power-driven modular conveyor belts, which are used in industry for product transportation and designed by engaging multiple modules end to end and side by side.

The invention particularly relates to modular conveyor belts, which enable the products with oval geometry that are likely to move on the belt, to be transported in a regular and balanced manner without causing any accumulation.

STATE OF THE ART

The conveyor belts are products that transport various products in the industry by moving with any power drive. There are two different types as integral and modular. Integral conveyor belts consist of a single piece of flexible strip with various widths and lengths. Modular conveyor belts are products that are arranged end-to-end and side by side, and are engaged with each other with hinges, pins and similar connection elements. The invention of the description relates to the abovementioned modular conveyor belts.

Modular conveyor belts are products consist of a plurality of sections (called modules) substantially connected end-to-end in series. Modular conveyor belts are frequently used products, they can be easily adjusted according to the type of product to be transported and the power drive machine to which it is connected by changing the number of modules that constitute the conveyor belts. Furthermore, wear and similar possible damages on the modular conveyor belts can be repaired by replacing worn or damaged module or modules without the need to replace the entire conveyor belt.

During the transportation of oval-shaped products such as vegetables and fruits in the conveyor belts of the state of the art, products move on the conveyor belt, this situation causes accumulation in the conveyor exit section (packaging or separation line transition sections). In the sections where accumulation occurs, the overlapping products crush each other and cause cosmetic damage. Furthermore, the inability to transport the products in a homogeneous flow density leads to an extra load on some parts of the conveyor belt, while not on some parts, this imbalance causes wear, distortion and similar physical damage to the modules of the conveyor belt.

A conveyor belt, which is mostly designed to be used in spiral conveyors, and contains modules that are associated with each other by means of their grooves, is disclosed in the USA patent document numbered US2010307892A1 found in the literature research. This belt does not contain any solution method with oval geometry so as to prevent accumulation that occurs during the transportation of products.

A conveyor belt for use in spiral conveyor is disclosed in the Chinese patent document numbered CN101336199 found in the literature research. This belt, as mentioned in the invention in the previous paragraph, does not contain any solution method with oval geometry so as to prevent accumulation that occurs during the transportation of products.

Consequently, a new modular conveyor belt is required in which the state of the art is exceeded, the disadvantages are eliminated.

BRIEF DESCRIPTION OF THE INVENTION

The invention is a modular conveyor belt which exceeds the state of the art, eliminates the disadvantages and has some additional features.

In particular, the aim of the invention is to provide a modular conveyor belt, which enable the products with oval geometry that are likely to move on the belt, to be transported in a regular and balanced manner without causing any accumulation.

Another aim of the invention is to provide a novel modular conveyor belt, which consists of modules with a geometry that is end-to-end and forms a peak and a recess when they come together, so as to ensure the transportation of products in a regular and balanced manner, in a homogeneous flow.

Another aim of the invention is to provide a novel modular conveyor belt that prevents the products from being crushed and damaged due to accumulation.

Another aim of the invention is to provide a novel modular conveyor belt, in which the possibility of possible conveyor damage is reduced by transporting the products in a homogeneous flow, with a balanced load.

In order to achieve all aims mentioned above and which will emerge from the detailed description below, the present invention is a modular conveyor belt which is used for product transportation in industry, ensures that products with oval geometry, which are likely to move on the belt, are transported in a regular and balanced manner without causing any accumulation, has a movable connection point that has the same function as the hinge and pin connection, which allows the modules to be engaged end-to-end in a movable manner, characterized in that, it has a geometric form in which the height of the ends of the modules is lower than the height of the middle part of the module according to the side view of the module so as to ensure that the products are transported without moving in the recess forms by creating peak and recess forms by engaging the modules end-to-end.

DESCRIPTION OF THE FIGURES

The invention will be described with reference to the accompanying drawings, thus the characteristics of the invention will be understood clearly. However, the aim of this is not to limit the invention with such certain embodiments. On the contrary, it is aimed to cover all alternatives, amendments and equivalents which may be contained in the field defined by the accompanying claims. It is to be understood that the details shown are only shown for the sake of illustrating the preferred embodiments of the present invention and presented for both illustrating the methods and for providing description of the rules of the invention and the conceptual features of the invention to be easily understood. In these figures;

The figures which enable to clarify this invention are enumerated as mentioned in the attached figure and they are given with their names herein below.

DESCRIPTION OF THE REFERENCES

1. Modular conveyor
10. Single line module group
100. Module

101. Movable connection point
102. Side Connection Element
A. Peak
B. Recess

DESCRIPTION OF THE INVENTION

In this detailed description, the inventive modular conveyor belt (1) is described by means of examples only for clarifying the subject matter such that no limiting effect is created. In the description, a modular conveyor belt (1) which is used for transportation in industry, is designed by associating many modules end-to-end and side-by-side, particularly enables the products with oval geometry that are likely to move on the belt, to be transported in a regular and balanced manner without causing any accumulation.

Figure 1:
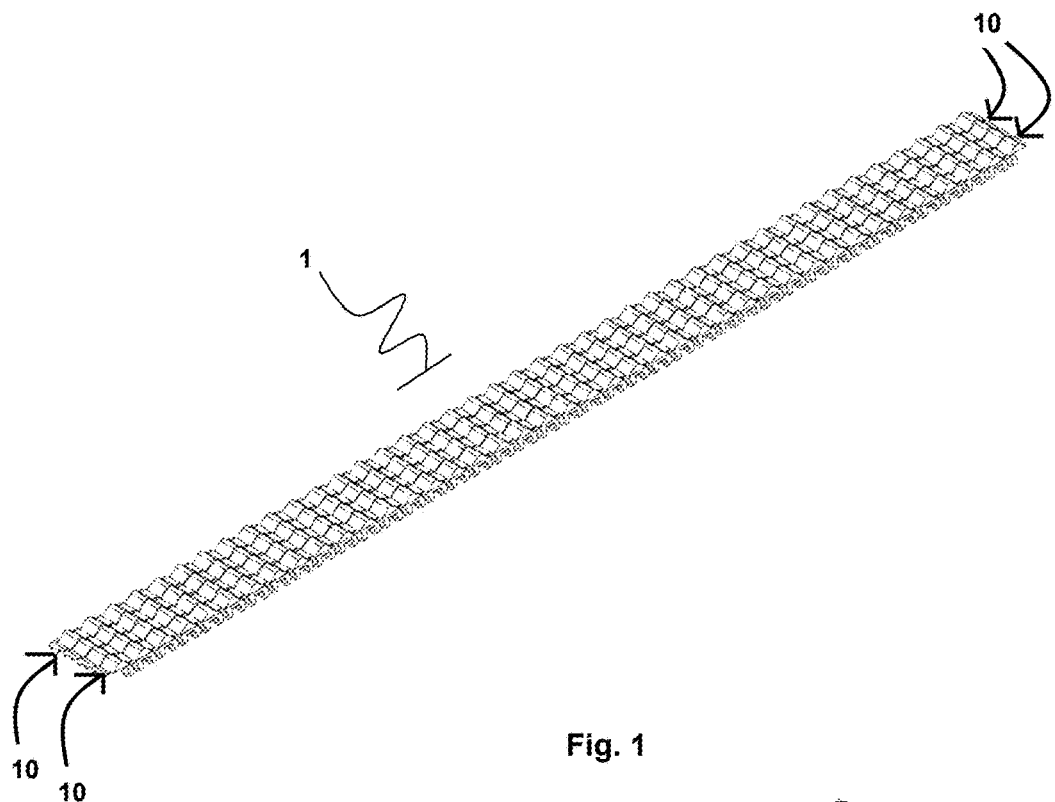
FIG. 1 is a perspective view of the inventive modular conveyor.

In FIG. 1, a perspective view of the inventive modular conveyor band (1) is shown. Accordingly, the modular conveyor belt (1) comprises a plurality of single-line module groups (10) aligned side by side. The single line module group (10) also consists of end-to-end attached, movable connection points (101) with hinge and pin connection and end-to-end attached modules (100). The number of single line module groups (10) aligned side by side is selected according to the width of the modular conveyor belt (1). Likewise, the number of modules (100) attached end to end in the single line module group (10) is selected according to the height of the modular conveyor belt (1). As seen in the figure, there are peaks (A) and recesses (B) on the modular conveyor belt (1). The structure consisting of these peaks (A) and recesses (B) ensures that the products are transported in a homogeneous flow and without any accumulation in the outlet section.

Figure 2:
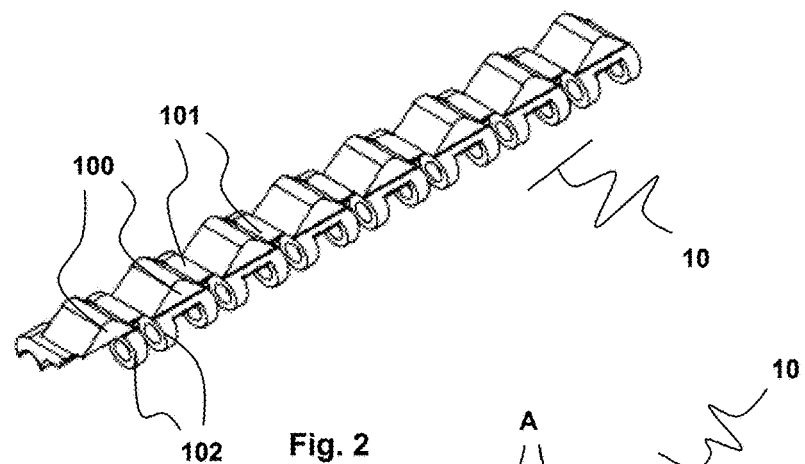
FIG. 2 is a perspective view of the single line module group of the inventive modular conveyor.

In FIG. 2, the perspective view of the inventive modular conveyor belt (1), showing the single line module group (10) is given. When the single line module group (10) seen here is engaged side by side, the modular conveyor belt (1) is formed. In the modular conveyor belt (1), single line module groups (10) are provided with the side connection elements (102) located in the modules (100).

The modules (100) are engaged with connection elements, which can be screws and nuts from the side connection elements (102) on their side sections.

Figure 3:
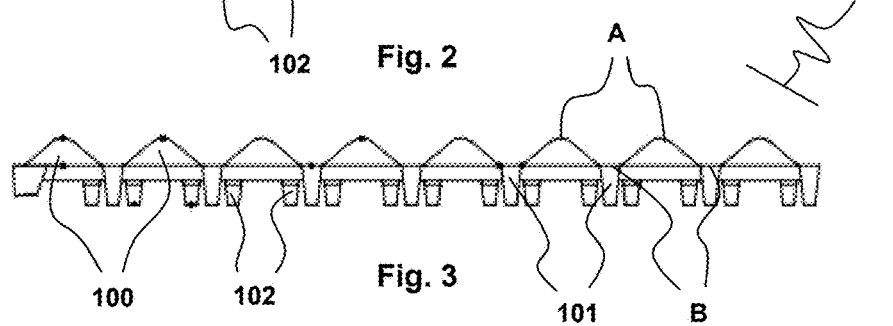
FIG. 3 is a side view of the single line module group of the inventive modular conveyor.
Figure 4:
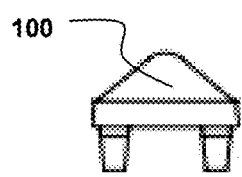
FIG. 4 is a side view of a module of the inventive modular conveyor.

In FIG. 3, the side view of the modular conveyor belt (1) is seen as a single line module group (10). Thus, when the modules (100) forming the single line module group (10) are connected to each other end-to-end on the movable connection point (101), they have a geometric form to form peak (A) and recess. Therefore, the transported products will be placed in the recess (B) sections and can be transported without moving on the modular conveyor belt (1), in a regular manner, without any accumulation. As can be seen in FIG. 4, the geometry that constitutes the peak (A) and recess (B) formation is provided by designing the modules (100) used from a lower height dimension than the middle section of the two ends. Thus, the side view geometry of the module (100) may be in the form of a triangle. Similarly, the form of the module (100) may be in the form of an inverted "U" or in the form of an inverted "V" with rounded pointed parts.

The inventive modular conveyor belt (1) can preferably be made of plastic and metal materials.

The invention claimed is:

1. A modular conveyor belt assembly comprising:
   a first module; and
   a second module hingedly connected to said first module by a hinge-and-pin connection at a mobile connection point so as to allow said first module to be movably engaged in end-to-end relation with said second module, wherein each of said first module and said second module has a geometric form between one end and an opposite end of each of said first module and said second module, wherein the geometric form has a height between the one end and the opposite end that is greater than a height at the one end or a height at the opposite end, the height continuously increasing from the one end and continuously increasing from the opposite end, the geometric form of each of said first module and said second module defining a peak and defining a valley between the peaks of said first module and said second module, wherein the geometric form is parallel to a direction of movement of the modular conveyor belt assembly.

2. The module conveyor belt assembly of claim 1, wherein the geometirc form is triangular.

3. The module conveyor belt assembly of claim 1, wherein the geometric form is of an inverted U-shape.

4. The module conveyor belt assembly of claim 1, wherein the geometric form is of an inverted V-shape.

5. The module conveyor belt assembly of claim 1, further comprising:
   a first side connection element affixed to or formed with a lower side of said first module; and
   a second side connection element affixed to or formed with a lower side of said second module, said first side connection element being joined to said second side connection element with a screw-unit connector.

* * * * *